United States Patent [19]

Crossan

[11] Patent Number: 4,560,727
[45] Date of Patent: Dec. 24, 1985

[54] THERMOPLASTIC MOLDING COMPOSITION

[75] Inventor: J. Robert Crossan, Houston, Tex.

[73] Assignee: Shell Oil Company, Houston, Tex.

[21] Appl. No.: 495,890

[22] Filed: May 18, 1983

[51] Int. Cl.$^4$ .............................................. C08L 53/00
[52] U.S. Cl. ......................................... 525/95; 525/98
[58] Field of Search .................................... 525/98, 95

[56] References Cited

U.S. PATENT DOCUMENTS

| | | | |
|---|---|---|---|
| 3,299,174 | 1/1967 | Kuhre et al. | 525/98 |
| 3,810,957 | 5/1974 | Lunk | 260/876 B |
| 4,020,025 | 4/1977 | Zeitler et al. | 525/98 |

FOREIGN PATENT DOCUMENTS 826831  3/1974  Belgium .

*Primary Examiner*—Jacob Ziegler
*Attorney, Agent, or Firm*—Jennifer R. Daunis

[57] ABSTRACT

A thermoplastic molding composition having high impact strength and improved oxidation stability composes a physical blend, in defined proportions, of polystyrene, a hydrogenated styrene-diene block copolymer and low density polyethylene, together with a process for preparing such compositions.

6 Claims, No Drawings

THERMOPLASTIC MOLDING COMPOSITION

BACKGROUND OF THE INVENTION

1. Field of the Invention

The present invention relates to a thermoplastic molding composition having high impact strength and enhanced oxidation stability based on a physical blend of polystyrene with a hydrogenated thermoplastic elastomeric block copolymer and low density polyethylene, together with a process for preparing such a composition by physically blending together such components.

2. Description of the Prior Art

High impact molding compositions based on polystyrene conventionally contain polymeric styrene and a rubber polymer. It is known that good compositions may be obtained by physical blending of polystyrene with suitable rubbers, or by mixing the rubber polymer with monomeric styrene and graft polymerizing the mixture. Many types of rubber materials have been employed including natural rubber, polybutadiene, and styrene/diene copolymers. Such polystyrene compositions, although having acceptably high impact strength, do not normally have good oxidation stability, which causes them to deteriorate rapidly with exposure to sunlight and thereby suffer a reduction in their impact strength.

A valuable improvement in oxidative stability can be achieved through the physical blending of polystyrene with hydrogenated thermoplastic rubbers as described in U.S. Pat. No. 3,810,957, namely, with a block copolymer prepared by selectively hydrogenating the diene portion of a block copolymer having at least two polymer blocks of a monovinyl arene separated by at least one polymer block of a conjugated diene. However, in order to be commercially acceptable it is, of course, necessary for a product not only to have satisfactory properties but also to be capable of being marketed at a commercially acceptable price. The hydrogenated block copolymers utilized in the composition blends of U.S. Pat. No. 3,810,957 increase the overall cost of the final blended product, and it would therefore be desirable if alternative composition ingredients could be found which would enable the desired properties to be attained with a reduced level of block copolymer.

The applicant has discovered that this desirable objective can be met by substituting low density polyethylene for part of the block copolymer used in the compositions of U.S. Pat. No. 3,810,957. Compositions suitable for expansion by a blowing agent are disclosed in Belgian Pat. No. 826,831, said compositions comprising polystyrene, polyethylene and a mixing adjuvant/compatabilizing agent. The general disclosure of that document describes a very broad range of polymer blends, including polystyrene/low density polyethylene/hydrogenated styrene/butadiene copolymers, but the specific examples and detailed explanations clearly indicate that the products actually envisaged contain substantial amounts (sometimes even a major amount) of polyethylene. No specific disclosure is made of compositions containing a substantial predominence of polystyrene, nor is there any suggestion in that disclosure that the blending of minor amounts of low density polyethylene and hydrogenated block copolymers with polystyrene will yield a high impact polystyrene composition having good oxidation resistance.

SUMMARY OF THE INVENTION

Accordingly, the present invention provides a high impact thermoplastic molding composition having improved oxidation stability comprising a physical blend of (a) 70 to 80 parts by weight of polystyrene;

(b) 10 to 15 parts by weight of a selectively hydrogenated block copolymer which, prior to hydrogenation, has at least two polystyrene blocks of molecular weight from about 5,000 to about 75,000, separated by at least one diene polymer block derived from butadiene or isoprene of molecular weight from about 30,000 to about 300,000, the polystyrene blocks comprising from about 25 to about 50% by weight of the total block copolymer, and the diene polymer block, after hydrogenation, being at least 90% saturated; and (c) 10 to 15 parts by weight of low density polyethylene.

In a further aspect, the invention provides also a process for preparing a high impact thermoplastic molding composition which comprises physically blending (a) from 70 to 80 parts by weight of polystyrene with (b) 10 to 15 parts by weight of a selectively hydrogenated block copolymer which, prior to hydrogenation, has at least two polystyrene blocks of molecular weight from about 5,000 to about 75,000, separated by at least one diene polymer block derived from butadiene or isoprene of molecular weight from about 30,000 to about 300,000, the polystyrene blocks comprising from about 25 to about 50% by weight of the total block copolymer and the diene polymer block, after hydrogenation, being at least 90% saturated; and (c) 10 to 15 parts by weight of low density polyethylene.

The compositions of the present invention retain not only the good oxidation stability of the polystyrene/hydrogenated block copolymer blends of U.S. Pat. No. 3,810,957, but also their high impact strength allied with a lower cost resulting from the partial replacement of the block copolymer by low density polyethylene. The applicants investigations revealed that if the block copolymer in such polystyrene blends is partially replaced by a polyolefin there is normally a dramatic, and totally unacceptable, drop in the impact strength. Thus, partial replacement by polybutylene, polypropylene or high density polyethylene yields a product having a very low impact strength, whereas—in unexpected contrast—partial replacement by low density polyethylene causes only a slight, and tolerable drop in the impact strength.

DETAILED DESCRIPTION OF THE INVENTION

The polystyrene present in the blended compositions of this invention is suitably of the type generally known as "crystal" or "general purpose" polystyrene. Preferably, these polymers have an intrinsic viscosity in the range of from about 0.5 to about 1.5, especially from about 0.6 to about 1.0, dl/g (as determined using a 0.25 g/100 ml solution in toluene at 30° C.).

The block copolymers suitable for hydrogenation and subsequent use in the compositions of the present invention have at two polystyrene blocks (S), separated by at least one diene polymer block (D) derived from butadiene or isoprene, the block configurations being represented by one of the formulae: S—D—S; S—(-

D—S)$_{2-5}$ or S—D—(D—S)$_{2-5}$. The polystyrene blocks, which may comprise from about 25 to about 50%, preferably from about 32% to about 45%, of the total block copolymer, have molecular weights from about 5,000 to about 75,000, preferably from about 8,000 to about 60,000. The diene polymer block, or when two polydiene blocks are immediately adjacent to each other the combined block, has an average molecular weight from about 30,000 to about 300,000, preferably from about 50,000 to about 300,000.

The processes for the preparation of the block copolymers and for their hydrogenation do not form part of the present invention, and are described in U.S. Pat. Nos. 3,595,942 and 3,810,957, the contents of which are incorporated herein by reference. In general, the block copolymers particularly useful for the compositions of this invention are S—EB—S or S—EP—S copolymers. Thus, they may be the polystyrene/poly(ethylene/butylene)-polystyrene block copolymers derived from the hydrogenation of polystyrene-polybutadiene-polystyrene block copolymers, wherein the polybutadiene block is a rubbery polybutadiene having a suitable 1,2-polybutadiene to 1,4-polybutadiene ratio, e.g., from about 30:70 to about 70:30, and especially from about 35:65 to about 55:45. (The microstructure of the polybutadiene may be determined by conventional infra-red analysis according to the procedure of Silas et al; Analytical Chemistry, Vol. 31, pp. 529-532 (1959)). Alternatively, they may be the polystyrene-poly(ethylene/propylene)-polystyrene block copolymers derived from the hydrogenation of polystyrene-polyisoprene-polystyrene block copolymers, wherein the polyisoprene block contains at least 70% cis 1,4 content. Thus, the polymer chain of the diene block D contains a plurality of pendant methyl or ethyl substituents distributed along the chain, which may be found on up to about 70% of the carbon atoms on the polymer chain.

The low density polyethylene present in the compositions of this invention may have a density in the range of from about 0.91 to about 0.94 g/cc. It is preferably the polyethylene produced by a free radical mechanism at very high pressures (also known as high pressure polyethylene), which is generally characterized by branching and absence of crystallinity and a density in the range of from about 0.910 to 0.925 g/cc, or it may be the linear low density polyethylene (LLDPE) produced by polymerization at low pressures over certain transition metal catalysts, which are characterized by linearity with regular short branches and low crystallinity. The production of LLDPE is described in U.S. Pat. Nos. 4,011,382 and 4,128,607.

The components of the composition of this invention may be physically blended together by any of the well-known methods such as by milling, extruding or mixing (e.g., Banbury mixer). In general, the physical blending is performed at a temperature of from about 140° to about 270° C., preferably from about 170° to 250° C. Higher and lower temperatures may also be employed. The ratio of the components is, in parts by weight, from about 70 to about 80 parts polystyrene, from about 10 to about 15 parts each of the block copolymer and the low density polyethylene. A preferred composition is that containing 75% polystyrene, 12½% block copolymer and 12½% polyethylene.

Inert ingredients such as conventional filler materials for the polystyrene, e.g., silicas, carbon black, talc, titanium oxides and the like; antioxidants such as, e.g., 2,6-di-tert-butyl-4-methyl phenol and/or trisnonylphenyl phosphite; and light stabilizers such as the 2-alkyl-2-3,4-benzotriazoles may be added to the molding composition. They may be added at any convenient time during the preparation of the molding composition of this invention.

It is also generally desirable to add a lubricant in order to improve moldability of the composition, and any of the known lubricants may be used in this invention. Examples of lubricants include ester lubricants such as butyl stearate, mineral oil, paraffin wax and combinations of these lubricants.

Advantages of the present invention are illustrated by the following example. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight. Impact data are in ft. lbs./in. of notch at 23° C.

EXAMPLE

Polystyrene was physically blended with a S—EB—S block copolymer and low density polyethylene (LDPE), or, for the purposes of comparison, certain alternative polyolefins in place of the LDPE. The specific materials blended were:

Polystyrene-poly(ethylene/butylene)-polystyrene block copolymer sold by Shell Chemical Company (SCC) under the designation "Kraton" ®G 1651, or the masterbatch of that block copolymer and oil available under the designation "Kraton" ®G 4610.

Low density polyethylene (LDPE) sold by U.S. Industrial Chemicals (USI) under their designation NA 202, having a density of 0.915 g/cc and a melt index of 22.0 g/10 min.

Alternative, comparative, polyolefins:

High density polyethylene (HDPE) sold by USI under their designation 861, having a density of greater than 0.960 and a melt index of 2.0 g/10 min.

Polypropylene (PP) sold by SCC under their designation PP 7038.

Polybutylene (PB) sold by SCC under their designation PB 0100.

The mixing was carried out in a Bolling Mixer for 6 minutes at a target temperature of 190° C., although because of melt differences in the polymers the actual temperature ranged from 175° C. to 250° C. The styrene and the block copolymer were added to the mixer and heated until melt conditions were attained. The selected polyolefin was then added over 2-3 minutes and the complete batch mixed for 6 minutes. During that time steam and shear heat took the temperature to between 190° C.-200° C., when water was used for temperature control. After the 6 minute blending period the steam was turned off, the mixer slowed down and water used to cool the mixture to below 175° C. before its removal from the mixer. Total operation time was usually 12 to 15 minutes.

The proportions of the individual components, and the Gardner Impact Strength of the resulting blends are set out in the Table below. From these results it will be readily apparent that those blends containing LDPE have a dramatically higher impact strength than those containing other polyolefins.

TABLE

BLEND COMPOSITION

| Polystyrene | Block Copolymer 1651 | Block Copolymer 4610 | Polyolefin | Gardner Impact in-lbs |
|---|---|---|---|---|
| | | | LDPE | |
| 75 | 12.5 | — | 12.5 | 108 |
| 75 | — | 12.5 | 12.5 | 137 |
| | | | HDPE | |
| 75 | 12.5 | — | 12.5 | 10 |
| 75 | 15.0 | — | 10.0 | 43 |
| 75 | — | 15.0 | 10.0 | 77 |
| | | | PP | |
| 75 | 12.5 | — | 12.5 | 3 |
| 75 | — | 12.5 | 12.5 | 11 |
| | | | PB | |
| 75 | 12.5 | — | 12.5 | <2 |
| 75 | 10.0 | — | 15.0 | <2 |
| 75 | — | 12.5 | 12.5 | 5 |
| 75 | — | 15.0 | 10.0 | 3 |

What is claimed is:

1. A high impact thermoplastic molding composition having improved oxidation stability comprising a physical blend of:
   (a) 70 to 80 parts by weight of polystyrene;
   (b) 10 to 15 parts by weight of a selectively hydrogenated block copolymer which, prior to hydrogenation, has at least two polystyrene blocks of molecular weight from about 5,000 to about 75,000 separated by at least one diene polymer block derived from butadiene or isoprene of molecular weight from about 30,000 to about 300,000, the polystyrene blocks comprising from about 25 to about 50% by weight of the total block copolymer, and the diene polymer block, after hydrogenation, being at least 90% saturated; and
   (c) 10 to 15 parts by weight of low density polyethylene with a density in the range of from about 0.910 to about 0.925 g/cc.

2. A composition as claimed in claim 1 wherein the block copolymer prior to hydrogenation is polystyrene-polybutadiene-polystyrene in which the polybutadiene has a ratio of 1,2-polybutadiene to 1,4-polybutadiene from about 30:70 to about 70:30, or is polystyrene-polyisoprene-polystyrene in which the polyisoprene contains at least 70% of the units in the cis 1,4 configuration.

3. A composition as claimed in claim 2 wherein the block copolymer is polystyrene-polybutadiene-polystyrene in which the polybutadiene component has a 1,2 to 1,4 ratio of from about 35:65 to about 55:45 and is selectively hydrogenated to at least 95% saturation.

4. A composition as claimed in claim 1 wherein the diene polymer component of the block copolymer is selectively hydrogenated to at least 99% saturation.

5. Process for preparing a high impact thermoplastic molding composition having improved oxidation stability which comprises physically blending
   (a) from 70 to 80 parts by weight of polystyrene with
   (b) 10 to 15 parts by weight of a selectively hydrogenated block copolymer which, prior to hydrogenation, has at least two polystyrene blocks of molecular weight from about 5,000 to about 75,000, separated by at least one diene polymer block derived from butadiene or isoprene of molecular weight from about 30,000 to about 300,000, the polystyrene blocks comprising from about 25 to about 50% by weight of the total block copolymer, and the diene polymer block, after hydrogenation, being at least 90% saturated; and
   (c) 10 to 15 parts by weight of low density polyethylene with a density in the range of from about 0.910 to about 0.925 g/cc.

6. Process as claimed in claim 5 wherein the blending is carried out at a temperature of from about 170° to 250° C.

* * * * *